United States Patent [19]

Fein

[11] 4,200,017

[45] Apr. 29, 1980

[54] SECTIONING APPARATUS FOR ELONGATE MATERIAL

[75] Inventor: Hubert Fein, Olpe, Fed. Rep. of Germany

[73] Assignee: Firm Josef Frohling, Olpe, Fed. Rep. of Germany

[21] Appl. No.: 917,266

[22] Filed: Jun. 20, 1978

Related U.S. Application Data

[63] Continuation-in-part of Ser. No. 696,224, Jun. 15, 1976, abandoned.

[30] Foreign Application Priority Data

Jan. 7, 1976 [DE] Fed. Rep. of Germany ....... 2600402

[51] Int. Cl.² .................. B23D 25/12; B26D 1/56
[52] U.S. Cl. .................................. 83/333; 83/341; 83/342
[58] Field of Search .................... 83/333, 341, 342

[56] References Cited

U.S. PATENT DOCUMENTS

| | | | |
|---|---|---|---|
| 1,088,308 | 2/1914 | Wallis | 83/333 |
| 1,274,623 | 8/1918 | Spiegel | 83/333 |
| 2,026,533 | 1/1936 | Haupt | 83/342 |
| 3,283,634 | 11/1966 | Lodjic | 83/333 |
| 3,322,012 | 5/1967 | Murray | 83/341 |
| 3,633,831 | 1/1972 | Dodson | 83/342 X |

*Primary Examiner*—Donald R. Schran
*Attorney, Agent, or Firm*—Fleit & Jacobson

[57] ABSTRACT

Method and apparatus for sectioning traveling elongate material. The apparatus has a pair of cutting cylinders mounted for rotation with their axes substantially parallel. Cutting edges are formed at the peripheries of adjacent tapered end faces of the cutting cylinders, the cutting edge of one cylinder being in close proximity to that of the other. The cutting cylinders are rotated in synchronism so that the cutting edges execute a cutting stroke in unison, the length of the cutting stroke being in excess of the width of the elongate material to be cut. A mechanism is provided which limits feeding of elongate material to material having a width less than the length of the cutting stroke. The method provides for the feeding of elongate material through a pair of rotating cutting cylinders which define a cutting path longer than the width of the elongate material.

5 Claims, 5 Drawing Figures

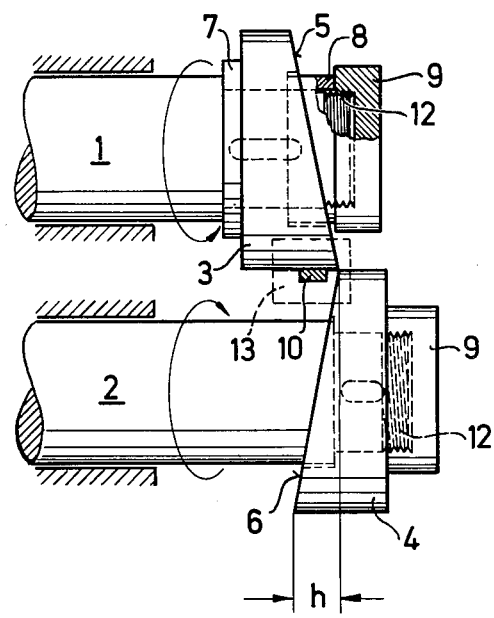
Fig. 1
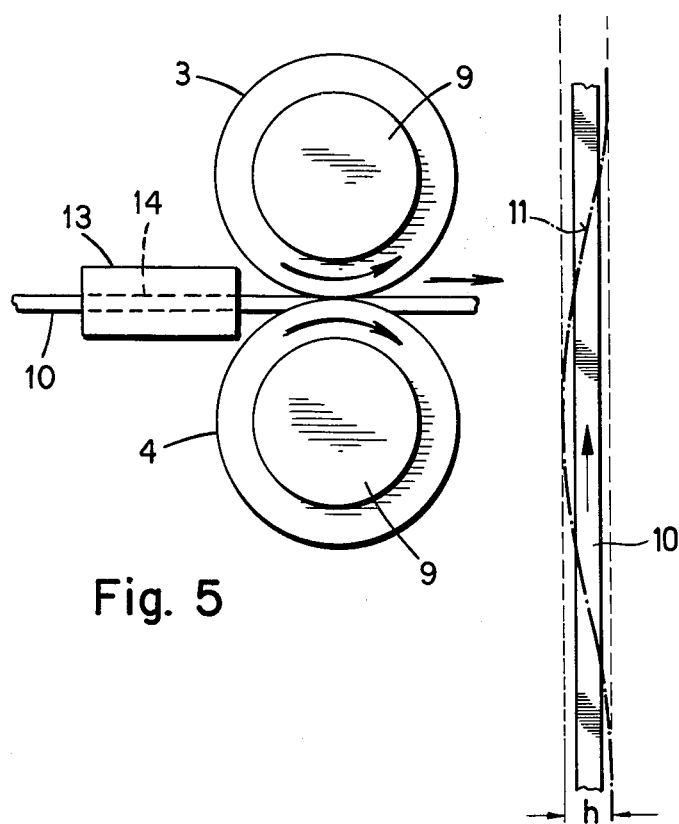
Fig. 2
Fig. 5

SECTIONING APPARATUS FOR ELONGATE MATERIAL

CROSS-REFERENCE TO RELATED APPLICATION

This application is a continuation-in-part application of U.S. patent application Ser. No. 696,224, filed June 15, 1976, now abandoned.

BACKGROUND OF THE INVENTION

1. Field of the Invention

The invention relates to a method and an apparatus for sectioning, shearing, or cutting up traveling elongate material, such as plastics or metal, particularly for comminuting strip trimmings that occur as waste when longitudinally dividing and edge planing steel or other metal strips. The apparatus of the invention is also suitable for cutting to a predetermined length metal tapes such as those used for tying and binding purposes during packaging.

2. Description of the Prior Art

In known such sectioning apparatus, the elongate material is either cut up with a shearing tool that produces cuts at right-angles to the material or a pair of rollers is provided, the rollers being provided with helical knives that produce an oblique cut through the elongate material.

With the known sectioning apparatus, the noise level is extremely high during operation. In the case of modern high-speed strip processing plants, such as longitudinal parting, edge planing and trimming machines for metal strips, the number of transverse cuts required to be executed by the sectioning apparatus working on the waste marginal portions of the strip is correspondingly high and the noise becomes almost unbearable. The noise certainly exceeds permissible levels and thus the use of the known sectioning apparatus is either severely limited or altogether impossible.

SUMMARY OF THE INVENTION

The invention aims to provide a sectioning apparatus that is constructed to work more quietly so that it can also be used in conjunction with modern high-speed processing plant. It is another aim of the invention to provide sectioning or shearing apparatus which is of simple construction and easy to regrind for sharpening purposes.

It is a still further object of the invention to provide a method for cutting up a moving elongate strip into a plurality of strips.

The sectioning apparatus according to the invention comprises a pair of cutting cylinders and means that mount the cylinders for rotation about their respective axes of symmetry with the axes substantially parallel and with the cylinder peripheries in close proximity to each other but with the cylinders axially offset from each other so that an end face of one cylinder is disposed adjacent an end face of the other cylinder. A cutting edge is formed at the periphery of each of the adjacent end faces of the cylinders, each end face being tapered so that its cutting edge reciprocates to execute a cutting stroke axially of the cylinder during rotation thereof. The adjacent end faces are equally but oppositely tapered, the taper angle in relation to the cylinder diameter being such that the length of the cutting stroke executed by the cutting cylinders is in excess of the width of the elongate material to be sectioned. Further, means are provided for rotating the cylinders synchronously in opposite directions. Further, a mechanism is provided for guiding the elongate material into the nip of the cutting cylinders substantially at right-angles to the said cylinder axes and at an axial position substantially mid-length of the cutting stroke of each cutting edge.

The method of the present invention provides for synchronously rotating cutting cylinders of the type previously described in opposite directions to define a cutting path having a predetermined length and for feeding elongate material, through a guide having a width less than the predetermined length, into the cutting path so that the material is cut into a plurality of separate pieces.

The invention, and its objects and advantages, will become more apparent in the detailed description of the preferred embodiments presented below.

BRIEF DESCRIPTION OF THE DRAWINGS

Two examples of the invention will be described with reference to the accompanying diagrammatic drawings, wherein:

FIG. 1 is a fragmentary part-sectional front elevation of one form of sectioning apparatus;

FIG. 2 is a plan view of a metal strip indicating the line of cut produced by the FIG. 1 apparatus;

FIG. 5 is a partial front elevational view of the sectioning apparatus of FIG. 1.

DESCRIPTION OF THE PREFERRED EMBODIMENTS

Figure 3:
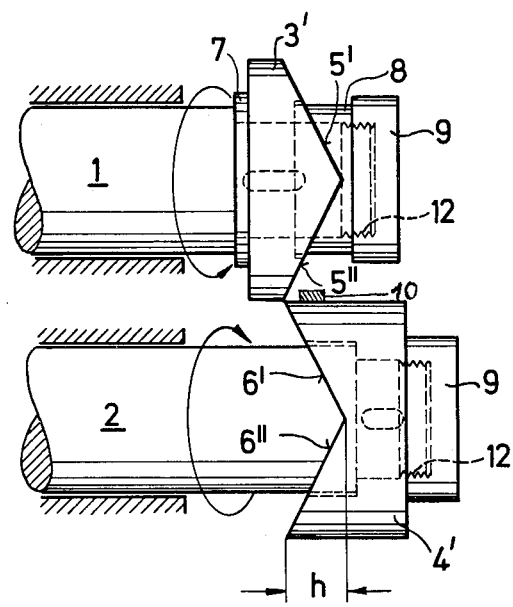
FIG. 3 is a view similar to FIG. 1 of a modified form of sectioning apparatus.

Because sectioning methods and apparatus are well known, the present description will be directed in particular to elements forming part of, or cooperating more directly with, the present invention, and elements not specifically shown or described herein are understood to be selectable from those known in the art.

Referring to FIG. 1, an upper shaft 1 and a parallel lower shaft 2 support respective right-circular cutting cylinders 3 and 4, each cutting cylinder having a tapered planar end face 5 and 6, respectively. The cutting cylinders are mounted to rotate with the shafts and are located in an axial direction by means of an end plate 9 that is secured to the respective shaft by interengaging screw-threads 12, the relative axial disposition of the cutting cylinders being adjustable by means of annular spacers 7, 8 on the shaft 1. The illustrated means for mounting and adjusting the cutting cylinders are given merely by way of example. Suitable different means will readily occur to a man skilled in the art. Similarly, although the shafts 1, 2 are shown as cantilever shafts, they could also be rotatably supported in bearings on both sides of the cutting cylinders.

In their adjusted position, the right-circular cylinders 3, 4 which have the same diameter, are disposed as illustrated, with the cylinder peripheries in close proximity to each other but with the cylinders axially offset so that the end face 5 is disposed adjacent the end face 6. Each said end face is ground to form a cutting edge at its periphery. The taper angles of two adjacent end faces are equal but opposite.

The arrangement of the cutting cylinders, i.e., in an axial direction, in proximity to each other and in their relative rotary positions, in such that the cutting edges almost touch at one point but will not interfere with one another when the cylinders are rotated in unison in the opposite directions indicated by the arrows by synchronous drive means acting on the shafts 1, 2. During rotation of the cylinders, each cutting edge therefore moves to and fro to the same extent in an axial direction to execute a cutting stroke h, the cutting strokes of the cutting edges of the two cylinders being coincident. The length of the cutting stroke h is governed by the equal taper angles of the end faces 5, 6 and by the equal diameters of the cylinders 3, 4 and is preselected so that it exceeds the width of the continuously moving steel strip 10 that is to be cut.

The traveling strip 10 is fed to the nip of the cutting cylinders 3, 4 by guide means 13 having an aperture 14 which terminates immediately in front of the cylinders. The width of the aperture 14 is less than the length of the cutting stroke and is preferably the same or slightly more than the width of the elongate material. The height of the aperture, opening, or passageway 14 is the same or slightly more than the height or thickness of the elongate material. It will be readily appreciated that other means besides aperture 14 can be used to prevent the feeding of elongate material having a width greater than the axial length of the cutting stroke.

The feeding direction of the strip through the aperture 14 is substantially at right-angles to the axis of symmetry of the cylinders, i.e., their rotary axes, and the strip is introduced substantially mid-length of the aforementioned cutting stroke h executed by the cutting edges. By reason of the above-described construction and arrangement, therefore, the line of cut effected by the cutting edges of the cylinders wanders from side-to-side as the edges perform their coincident cutting strokes. In fact, the line of cut is sinusoidal for the illustrated embodiment and is indicated in chain-dotted lines at 11 in FIG. 2.

In the rotary positions of the cutting cylinders 3, 4 as shown in FIG. 1, the almost touching cutting edges at the peripheries of the tapered faces 5, 6 are at the right-hand limit of their reciprocatory movement as viewed at the level of the strip or elongate material 10 and are disposed beyond the right-hand edge of the strip which, it will be recalled, is narrower than the length of the cutting stroke h. As the cylinders are rotated, the cutting edge at the periphery of the end face 6 executes its cutting stroke by approaching the traveling strip 10, cutting through it and moving to the left-hand limit of its reciprocatory movement disposed beyond the left-hand edge of the strip 10. At the same time, and in synchronism therewith, the cutting edge at the periphery of the tapered end face 5 moves from the right-hand to the left-hand limit of its reciprocatory stroke but without performing any cutting action on the strip because it merely serves as a backing roller for the strip that is being cut by the cylinder 4. Upon completion of the cutting stroke by the cylinder 4, the strip 10 will have flexed upwardly to an extent that it will not be supported by the curved surface of the cylinder 4. Upon continued rotation of the cutting cylinders, the edge at the periphery of the tapered end face 5 will now execute a cutting stroke as it wanders to the right-hand side back to the position shown in FIG. 1 whilst the cutting edge of the cylinder 4 executes a return or idling stroke. Each cutting cylinder has now executed one complete revolution and the cutting operation is repeated in the above-described manner as long as the cylinders continue to turn and the traveling strip 10 continues to enter the nip therebetween. From FIG. 2 it will be evident that the amplitude of the sinusoidal line 11 of cut is equal to the 'height' of the tapers on the end faces 5, 6 of the cutting cylinders and this figure also shows clearly the shape of the shorter lengths into which the strip 10 is cut.

The diameter of the cutting cylinders 3, 4 will be selected according to the thickness of the material that is to be cut by the sectioning apparatus. Once the diameter has been decided on, the taper of the faces 5, 6 will then be determined by the width of the strip 10 to be cut. Of course the greater the taper angle, the higher will be the amplitude of the sinusoidal line 11 of cut and the less critical is the position at which the strip is fed into the nip of the cylinders.

Apart from creating less noise, the sectioning apparatus is also advantageous by employing cutting cylinders that are easily manufactured and easily reground on conventional face grinders.

Figure 4:
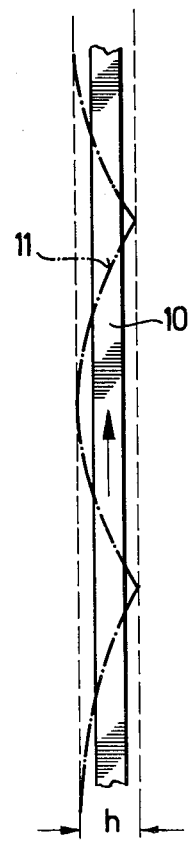
FIG. 4 is a view similar to FIG. 2 but showing the line of cut produced by the apparatus of FIG. 3.

Referring to FIG. 3, this embodiment of sectioning apparatus differs from that of FIG. 1 only insofar as the construction of the adjacent end faces of the cutting cylinders 3', 4' is concerned and the description of that figure will therefore be confined to this feature. In this case, each end face is formed by two equal and opposite planar tapers meeting at a diameter of the respective cutting cylinder. The tapers 5', 5" of the cylinder 3' define a projecting end face, whilst the tapers 6', 6" of the cylinders 4' define a complementary indented end face. The cutting cylinders are arranged in the same mirror image relationship to one another as in the first embodiment. As the cylinders are rotated in unison by a synchronous drive for the shafts 1, 2, the strip 10 is alternately severed by the cutting edges at the peripheries of the tapered end face portions along the modified line 11 of cut shown in FIG. 4. Thus, on rotation of the cylinders out of the FIG. 3 position by one quarter of a turn, the cutting edges of the tapered portion 5" executes a cutting stroke whilst the cutting edge of the tapered portion 6' is retracted and inoperative on the work. During the next one quarter revolution, the cutting edge at the periphery of the tapered portion 6" takes over by cutting through the work whilst the edge of the portion 5' executes an idling or return stroke. During the next quarter turn, the edges of the portion 5' is operative and finally the edge of the portion 6' cuts through the work and the cylinders have then returned to the relative position shown in FIG. 3.

The equal and opposite tapers on each cylinder end face are chosen with the same considerations in mind as described in relation to FIGS. 1 and 2, the cutting stroke h of each end face portion being longer than the strip 10 is wide. Basically, the difference between the two embodiments is that with the FIG. 1 construction two cuts are made through the strip 10 during each revolution of the cutting cylinders 3, 4 whilst with the FIG. 3 construction there are four cuts through the material during each revolution of the cutting cylinders 3', 4'.

It will be evident that it would also be possible to give each cylinder end face more than two tapers, thereby increasing the number of cuts per revolution and thereby still further reducing the length of the section that is cut from the leading end of the strip 10. The possibility of exchanging the pair of cutting cylinders for a pair having adjacent end faces of different configuration so as to produce a different number of cuts constitutes a further advantage of the sectioning apparatus according to the invention but the principal advantage is the comparatively low noise level produced, even during operation at high speeds.

It is not absolutely necessary that the tapers on the end faces be planar. Instead, each end face or end face portion may be profiled such as by being formed with steps or corrugations. The line 11 of cut will then no longer be sinusoidal as in FIG. 2 or partially sinusoidal as in FIG. 4 and this may prove advantageous for particular kinds or thicknesses of elongate material to be sectioned.

What is claimed is:

1. Sectioning apparatus for cutting traveling elongate material of a given width into a plurality of separate pieces, comprising:

means for cutting elongate material into a plurality of separate pieces including a pair of cutting cylinders, means for mounting said cylinders for rotation about their respective axes of symmetry with said axes substantially parallel and with the cylinder peripheries in close proximity to each other and with said cylinders axially offset from each other so that an end face of one cylinder is disposed adjacent an end face of the other cylinder, a cutting edge formed at the periphery of each said adjacent cylinder end face, each said end face being tapered so that its cutting edge reciprocates to execute a cutting stroke axially of said cylinder during rotation thereof, said cutting stroke having a predetermined axial length greater than the width of said elongate material, said adjacent end faces being equally but oppositely tapered, the taper angle of each said end face in relation to the cylinder diameter determining said axial length of said cutting stroke, and means for rotating said cylinders synchronously in opposite directions; and guide means for guiding elongate material having a width narrower than the axial length of said cutting stroke into the nip of said cylinders substantially at right-angles to said axes and at an axial position substantially midlength of said cutting stroke of each cutting edge, said guide means preventing the feeding of elongate material having a width greater than the axial length of said cutting stroke.

2. Apparatus according to claim 1, wherein said mounting means comprise a cantilever shaft for each said cutting cylinder.

3. Apparatus according to claim 1, wherein each said tapered end face is smooth.

4. Apparatus according to claim 1, wherein each said tapered end face is profiled by being formed with steps or corrugations.

5. Apparatus according to claim 1, wherein each said tapered end face is formed by two equal and opposite tapers meeting at a diameter of the respective cutting cylinders, said two tapers of one said cylinder defining a projecting end face and said two tapers of the other said cylinder defining a complementary indented end face.

* * * * *